US007039651B2

(12) United States Patent
Cotner et al.

(10) Patent No.: US 7,039,651 B2
(45) Date of Patent: May 2, 2006

(54) SYSTEM AND METHOD FOR EXECUTING A LARGE OBJECT FETCH QUERY AGAINST A DATABASE

(75) Inventors: Curt L. Cotner, Gilroy, CA (US); Robert A. Begg, Scarborough (CA); Brent P. Gross, Calgary (CA); Paul A. Ostler, Mariposa, CA (US); Timothy J. Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/425,851

(22) Filed: Apr. 29, 2003

(65) Prior Publication Data

US 2004/0167879 A1 Aug. 26, 2004

(30) Foreign Application Priority Data

Feb. 26, 2003 (CA) .................................. 2419982

(51) Int. Cl.
*G06F 17/30* (2006.01)
(52) U.S. Cl. ..................... 707/103 X; 707/10; 709/226
(58) Field of Classification Search ............. 707/1–10, 707/100–104.1, 200–205; 709/226
See application file for complete search history.

(56) References Cited

U.S. PATENT DOCUMENTS

| 5,873,083 | A | 2/1999 | Jones et al. ..................... 707/4 |
| 6,012,067 | A | 1/2000 | Sarkar .......................... 707/103 |
| 6,105,017 | A | 8/2000 | Kleewein et al. ............... 707/2 |
| 6,243,718 | B1 | 6/2001 | Klein et al. .................. 707/203 |
| 6,721,780 | B1 * | 4/2004 | Kasriel et al. .............. 709/203 |
| 6,904,433 | B1 * | 6/2005 | Kapitskaia et al. ........... 707/10 |
| 2001/0023420 | A1 | 9/2001 | Dong et al. ..................... 707/5 |
| 2001/0029537 | A1 | 10/2001 | Klein .......................... 709/224 |
| 2002/0055966 | A1 | 5/2002 | Border et al. ............... 709/200 |
| 2002/0143829 | A1 | 10/2002 | Rank et al. .................. 707/538 |
| 2002/0165856 | A1 * | 11/2002 | Gilfillan et al. ................ 707/3 |
| 2003/0055910 | A1 | 3/2003 | Amini et al. ............... 709/214 |

OTHER PUBLICATIONS

Kemper et al., "Adaptable pointer swizzling strategies in object bases: design, realization, and quantitative analysis", Jul. 1995, Springer-Verlag New York, Inc. Secaucus, NJ, USA, PP 519-567.*

* cited by examiner

*Primary Examiner*—Mohammad Ali
(74) *Attorney, Agent, or Firm*—Samuel A. Kassatly

(57) ABSTRACT

A database server helps to streamline the retrieval of LOB values by deciding to send a locator in replacement of the LOB value, or the LOB value itself, depending upon the specific LOB value being retrieved. A threshold value is determined in a fetch query, and the LOB sizes below that threshold are sent as values in a corresponding fetch response, and the lengths above are sent as locators in the fetch response. Indicators are inserted in a fetch parameter of the response to inform the receiving client the form of retrieval that was used for each requested LOB value being returned.

24 Claims, 6 Drawing Sheets

SYSTEM AND METHOD FOR EXECUTING A LARGE OBJECT FETCH QUERY AGAINST A DATABASE

PRIORITY CLAIM

The present application claims the priority of Canadian patent application, Serial No. 2,419,982, titled "Executing A Large Object Fetch Query Against A Database," which was filed on Feb. 26, 2003, and which is incorporated herein by reference.

FIELD OF THE INVENTION

The present invention relates in general to database management systems, and in particular to a system and associated method for executing a large object fetch query against a database.

BACKGROUND OF THE INVENTION

With the advent of Web application servers, the use of large objects (LOBs) in database systems is increasing. In many cases, these LOBs are used to store session state: serialized Java objects or other structures known to applications accessing the database systems. Once requested, retrieval of the LOBs from database servers to the application in a performance efficient fashion is critical.

Typically, these LOB objects are relatively small (i.e., less than 10 K), but on occasion they can be quite large (i.e., greater than 100 K). To take into account future growth, database administrators typically define quite large sizes (i.e., greater than 1 GB) for LOB columns of the database. If the database administrator knew these objects would never have the possibility of becoming LOBs, the column could be defined as long varchar for bit data. It is assumed that defining columns as LOBs indicates the corresponding objects will occasionally have very large values (i.e. considered as LOBs). There currently exists two methods for retrieving LOBs from the database, with current architectures: by defining a locator, or by asking for the LOB value.

The locator approach can have an advantage that only a handle flow is returned from the database server to the application. The actual LOB value remains on the database server until the application is ready to fetch the LOB value or any part of the LOB value. A disadvantage to the locator approach, especially in the case where the LOBs are relatively small, can be that an additional network flow to the database server is required to retrieve each LOB. Therefore, by always specifying locators in response to the data request, system drivers are forcing a second trip to the database server to retrieve the value of every LOB, thus exacting a potential system performance penalty.

An alternative approach for LOB retrieval is that of fetching the LOB value up front. LOB value retrieval can be more appropriate for the case of small LOBs, but can consume a considerable amount of memory on the client for large LOBs, especially if the application was only interested in a small portion of the large LOB. One disadvantage of the LOB retrieval method is that by always specifying the value to be returned, the client of the application can be occasionally hit by a very large LOB, which can force a significant amount of memory to be used at the client for LOB buffering. Further, the application may not require the entire LOB, and as a result may cause inefficiencies in client memory allocation and utilization.

Consequently, with current architectures, the application (or for example a JDBC/ODBC driver) must make the decision up front to retrieve the LOB either by the locator or by value. This decision is typically made by the driver without assistance from the application; the driver usually selects the locator approach. The locator approach can be the recommended approach for JDBC implementers to use. In either case, the decision for retrieval type is made at the client with possible knowledge of a defined maximum length of the column (which is often quite large), but without knowledge of the actual length of the particular resident LOB value in the corresponding database field.

What is therefore needed is a system and associated method that enable the database management system to make a dynamic decision for sending either the LOB locator or the LOB value in the fetch response, depending upon the actual value of the LOB in comparison to the threshold value. The need for such system and method has heretofore remained unsatisfied.

SUMMARY OF THE INVENTION

The present invention satisfies this need, and presents a system, a computer program product, and an associated method (collectively referred to herein as "the system" or "the present system") for executing a large object fetch query against a database.

A database management system DBMS (operating on a server) is adapted to receive a fetch query having a fetch request for fetching a LOB (large object). The DBMS processes each fetch request by accessing or retrieving LOB values from a database. The DBMS decides whether to return a LOB locator in place of returning a LOB value, or to return the LOB value by itself, depending upon a comparison between the specific LOB value being accessed or retrieved and a threshold value.

The threshold value is associated with the fetch query and is linked to the fetch request as a threshold parameter. The LOB value or the LOB locator is returned in a fetch answer corresponding to the processed fetch request. A fetch response containing each fetch answer is returned to a client by the DBMS as a result of the fetch query. During processing of each fetch request of the fetch query, LOB values (sizes) resident in the database and below the threshold value are retrieved and returned by the DBMS to the client as LOB values in the fetch answer corresponding to the fetch request. Otherwise, LOB values (sizes) resident in the database and above the threshold value are accessed but returned by the DBMS to the client in the fetch answer as LOB locators in the fetch request of the fetch response.

The use of the threshold parameter (with associated threshold value) provides a mechanism for returning LOB values to the client when the LOB value is considered relatively small, and sending the LOB locators when the LOB value is considered relatively large in comparison to the threshold value. Therefore, the use of the threshold parameter of the fetch query enables the database management system to make a dynamic decision (that is, a decision made on the fly) for sending either the LOB locator or the LOB value in the fetch response. The choice of including the LOB locator or LOB value in the fetch response depends upon the actual value of the LOB in comparison to the threshold value. For example, the LOB values lower than the threshold value are sent as LOB values in columns (i.e. the fetch answers) of the fetch response, while the LOB values larger than or equal to the threshold value are sent as LOB locators in place of the LOB values.

Distinct indicators are also included in the fetch response, placed in a fetch parameter. The fetch parameter is associated with the fetch response and is linked to the fetch answer, preferably one fetch parameter for each fetch answer. One of a pair of distinct indicator values is inserted in the fetch parameter for each fetch answer. This pair of distinct indicator values informs the receiving client (that is, the client receiving the fetch response) which form of access or retrieval was used for each requested LOB value being returned (via the fetch answers in the fetch response). As a result of the query received by the database management system (operating on the server), the fetch parameter uses these distinct indicator values to help inform the client of the form of access/retrieval present in the fetch response.

In an embodiment of the present invention, a method is provided for directing a database management system to execute a fetch query against a database used for storing LOB (Large Object) values and associated LOB locators. This fetch query is adapted to contain at least one LOB fetch request. This method includes the steps of:

receiving the fetch query, accessing a selected LOB value stored in the database, comparing the selected LOB value with the predefined threshold value, and returning a fetch response having a LOB fetch answer corresponding to the LOB fetch request according to one of a pair of return operations.

The fetch query includes a threshold parameter associated with the LOB fetch request and the threshold parameter has a predefined threshold value. The selected LOB value corresponds to the LOB fetch request of the fetch query. The first return operation of the pair returns the selected LOB value in the LOB fetch answer if the compared LOB value is less than the predefined threshold value. A second return operation of the pair returns the LOB locator in the LOB fetch answer if the compared LOB value is greater than the threshold value.

In another embodiment of the present invention, a computer program product is provided that has a computer-readable medium tangibly embodying computer executable instructions for directing a database management system to execute a fetch query against a database used for storing LOB (Large Object) values and associated LOB locators. The fetch query is adapted to contain at least one LOB fetch request. The computer program product comprises: computer readable code for receiving the fetch query, computer readable code for accessing a selected LOB value stored in the database, computer readable code for comparing the selected LOB value with the predefined threshold value, and computer readable code for returning a fetch response having a LOB fetch answer corresponding to the LOB fetch request according to one of a pair of return operations.

As described earlier, the fetch query includes a threshold parameter associated with the LOB fetch request and the threshold parameter has a predefined threshold value. The selected LOB value corresponds to the LOB fetch request of the fetch query. The first return operation of the pair returns the selected LOB value in the LOB fetch answer if the compared LOB value is less than the predefined threshold value. A second return operation of the pair returns the LOB locator in the LOB fetch answer if the compared LOB value is greater than the threshold value.

In yet another embodiment of the present invention, there is provided an article comprising a computer-readable signal-bearing medium usable on a network. This article also comprises means in the medium for directing a database management system to execute a fetch query against a database used for storing LOB (Large Object) values and associated LOB locators. The fetch query is adapted to contain at least one LOB fetch request. This article comprises: means in the medium for receiving the fetch query, means in the medium for accessing a selected LOB value stored in the database, means in the medium for comparing the selected LOB value with the predefined threshold value, and means in the medium for returning a fetch response having a LOB fetch answer corresponding to the LOB fetch request according to one of a pair of return operations.

As described earlier, the fetch query includes a threshold parameter associated with the LOB fetch request and the threshold parameter has a predefined threshold value. The selected LOB value corresponds to the LOB fetch request of the fetch query. The first return operation of the pair returns the selected LOB value in the LOB fetch answer if the compared LOB value is less than the predefined threshold value. A second return operation of the pair returns the LOB locator in the LOB fetch answer if the compared LOB value is greater than the threshold value.

In still another embodiment of the present invention, a database management system is provided for executing a fetch query against a database used for storing LOB (Large Object) values and associated LOB locators. The fetch query is adapted to contain at least one LOB fetch request. The database management system comprises: means for receiving the fetch query, means for accessing a selected LOB value stored in the database, means for comparing the selected LOB value with the predefined threshold value, and means for returning a fetch response having a LOB fetch answer corresponding to the LOB fetch request according to one of a pair of return operations.

As described earlier, the fetch query includes a threshold parameter associated with the LOB fetch request and the threshold parameter has a predefined threshold value. The selected LOB value corresponds to the LOB fetch request of the fetch query. The first return operation of the pair returns the selected LOB value in the LOB fetch answer if the compared LOB value is less than the predefined threshold value. A second return operation of the pair returns the LOB locator in the LOB fetch answer if the compared LOB value is greater than the threshold value.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. An embodiment is implemented in the C or C++ computer programming language (or other computer programming languages in conjunction with C/C++). Any limitations presented would be a result of a particular type of operating system or computer programming language and would not be a limitation of the present invention.

Figure 4:
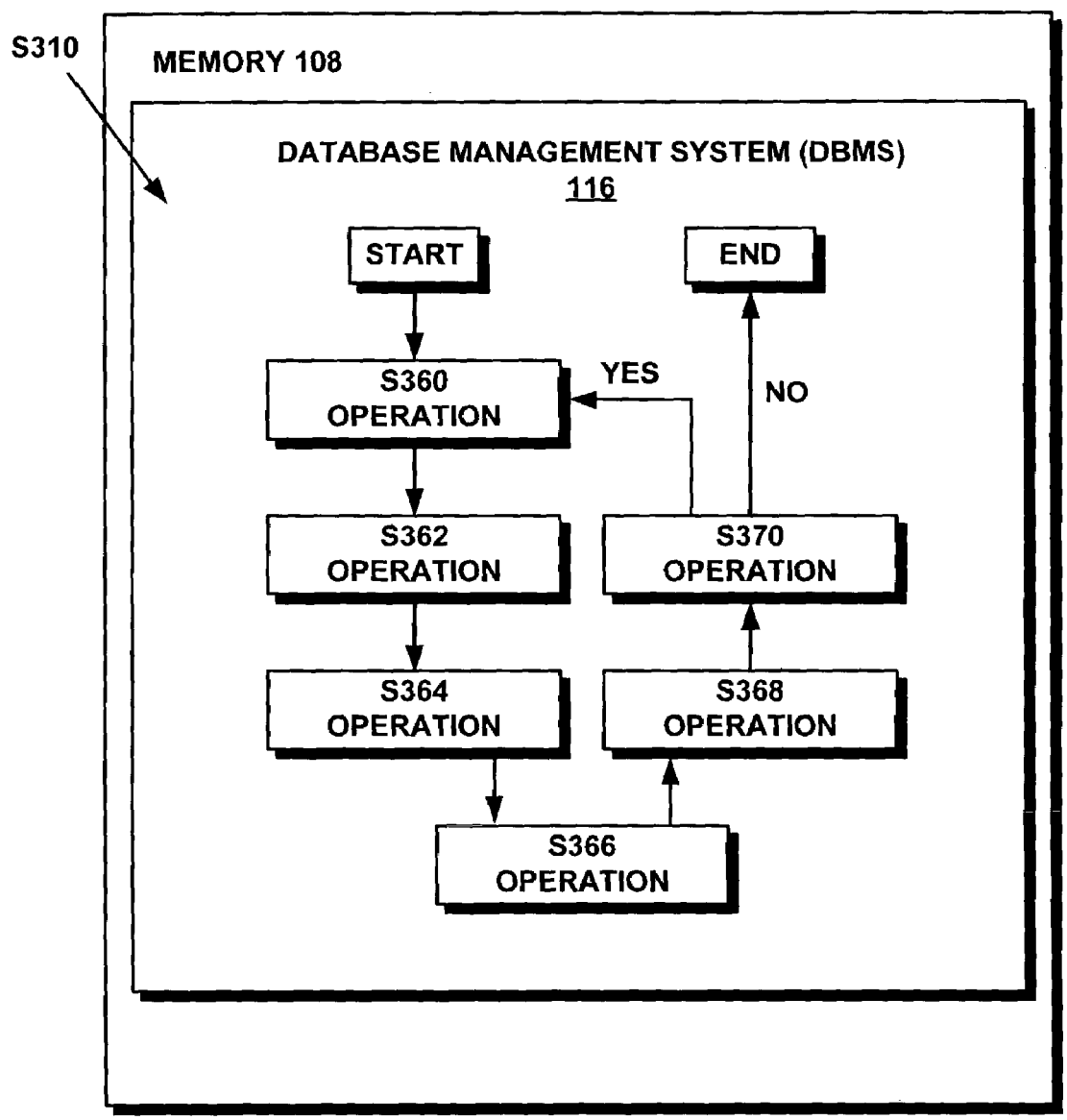
FIG. 4 is a block diagram illustrating a method of an operation of a database management system of FIG. 1.
Figure 5:
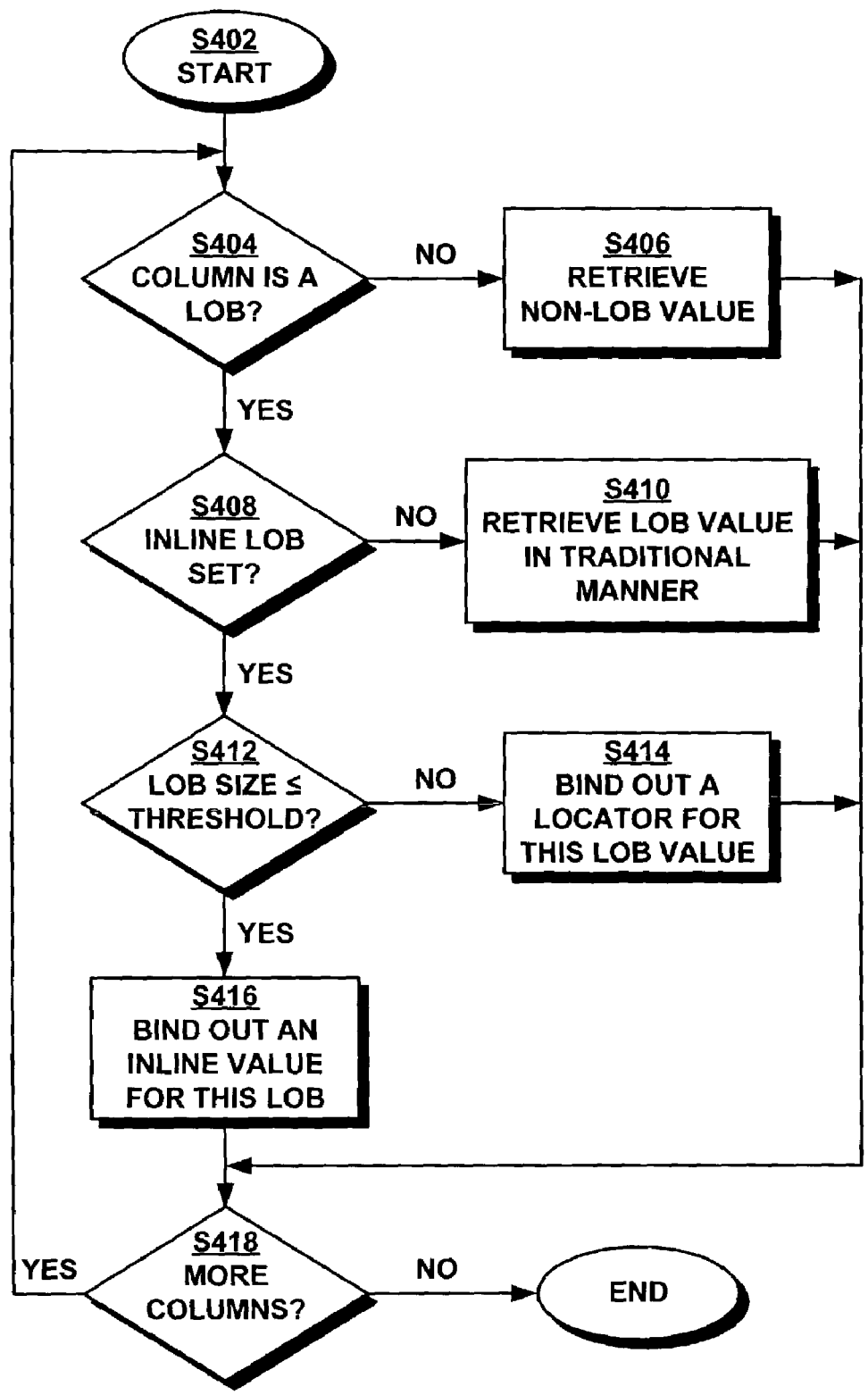
FIG. 5 is a process flow chart illustrating the method of a server fetch operation of the database management system of FIG. 4.
Figure 6:
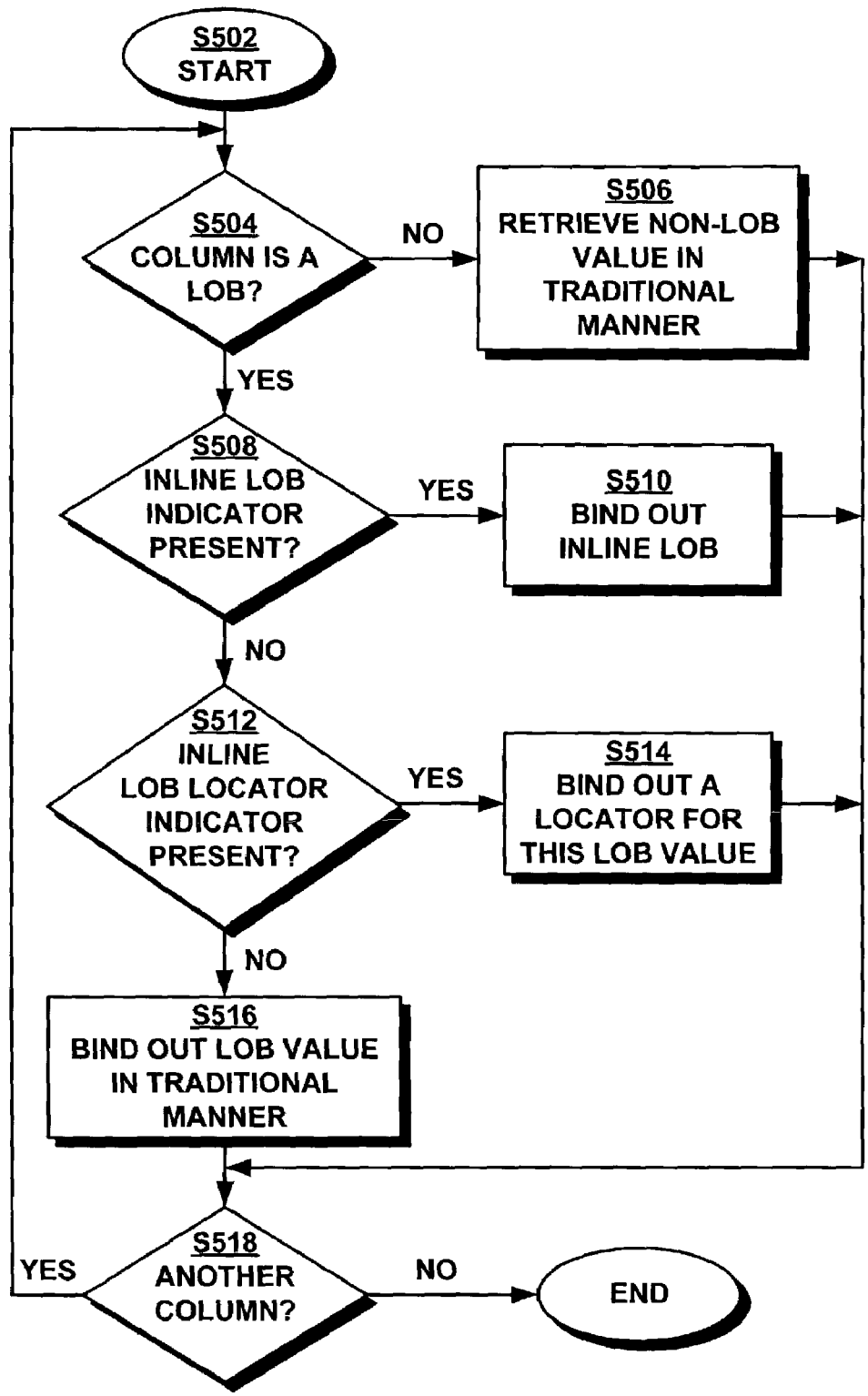
FIG. 6 is a process flow chart illustrating the method of a companion client fetch operation of the server fetch operation of FIG. 5.

The embodiments of the present invention provide a method (as shown in FIGS. 4, 5, 6), a data processing system (FIGS. 1 and 2), and/or a computer program product (not depicted), and/or an article (not depicted) for dynamic processing of a fetch query in a server database system. The server database system is coupled to a database adapted to store LOB values. It will be appreciated by those skilled in the art, that the article can be a signal-bearing medium for transporting computer readable code to a data processing system over a network, in which the code can be used to implement the method.

It will also be appreciated, by those skilled in the art, that the computer program product comprises a computer readable medium having computer executable code for directing a data processing system to implement the method. The computer program product can also be called a computer-readable memory, in which the memory can be a CD, floppy disk or hard drive or any sort of memory device usable by a data processing system. It will also be appreciated by those skilled in the art, that a data processing system may be configured to operate the method. The method may be operated either by use of computer executable code residing in a medium or by use of dedicated hardware modules, also generally or generically known as mechanisms or means, which may operate in an equivalent manner to the code which is well known in the art.

Figure 1:
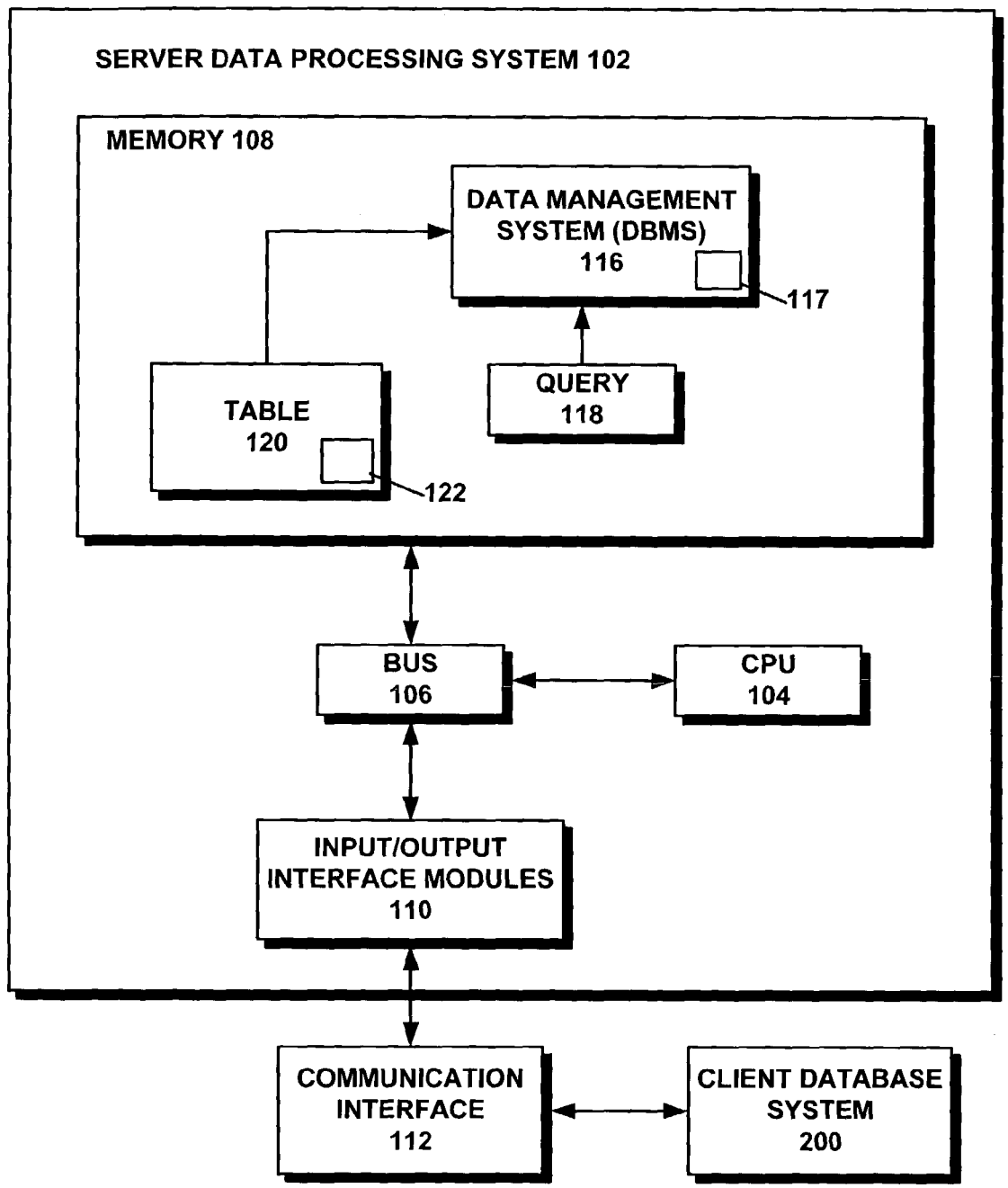
FIG. 1 is a schematic illustration of an exemplary server database system in which a large object fetch system of the present invention can be used.

FIG. 1 shows a server database system 100 comprising a server data processing system 102 having a memory 108 tangibly embodying a database management system (DBMS) 116, a collection of tables 120 having data 122, and a query 118 for instructing the DBMS 116 to interact with the tables 120. It will be appreciated that the collection of tables 120 may be included collectively as a single database, and that the database may be stored in the memory 108, or alternatively may be stored in memories of a plurality of distributed data processing systems (not depicted) which may be interconnected by a network (not depicted).

The DBMS 116 is a computerized information storage and retrieval system. For example, a relational database management system (RDBMS) is a type of the DBMS 116 that stores and retrieves the data 122 organized as tables 120. Each of the tables 120 comprises rows 300 and columns 302 (see FIG. 3A) of data 122. The database of the server database system 100 will typically have many tables 120 and each table 120 will typically have multiple rows 300 and multiple columns 302.

The DBMS 116 can be designed to store data 122 having a variety of data types. For example, the DBMS 116 may have the capability of storing and retrieving data 122 having standard data types, such as integers and characters, as well as non-standard data types, including very large data objects (LOBs). It is noted that typical DBMSs 116 can represent text, voice, and image data as LOB types. Exemplary applications 217 (see FIG. 2), server database system 100, and client database system 200 may involve multimedia applications for the World Wide Web; medical care applications (e.g., X-rays, MRI imaging, and EKG traces); and geographical, space, and exploration systems (e.g., maps, seismic data, and satellite images).

The memory 108 of the server database system 100 may include volatile and non-volatile memory such as but not limited to RAM (random Access memory) and/or ROM (read-only memory). Also embodied in the memory 108 is an operating system (not depicted) which may be a program that executes on the server data processing system 102 for running other computer executable programs (such as but not limited to the DBMS 116).

Operating systems perform basic tasks, such as recognizing input/output from input/output interface modules 110 (for example coupled to a keyboard and display screen), keeping track of files and directories on a disk in the memory 108, and controlling other peripheral devices such as but not limited to disk drives and printers. The memory 108 is operationally coupled to a CPU (Central Processing Unit) 104, and the input/output interface modules 110 via a bus 106.

Operationally coupled to the input/output interface modules 110 are input/output devices (such as a mouse and display unit), and persistent memory units (such as a hard drive, floppy drive). A communication interface 112 is used by the server database system 100 to communicate with the Client Database System 200.

Figure 2:
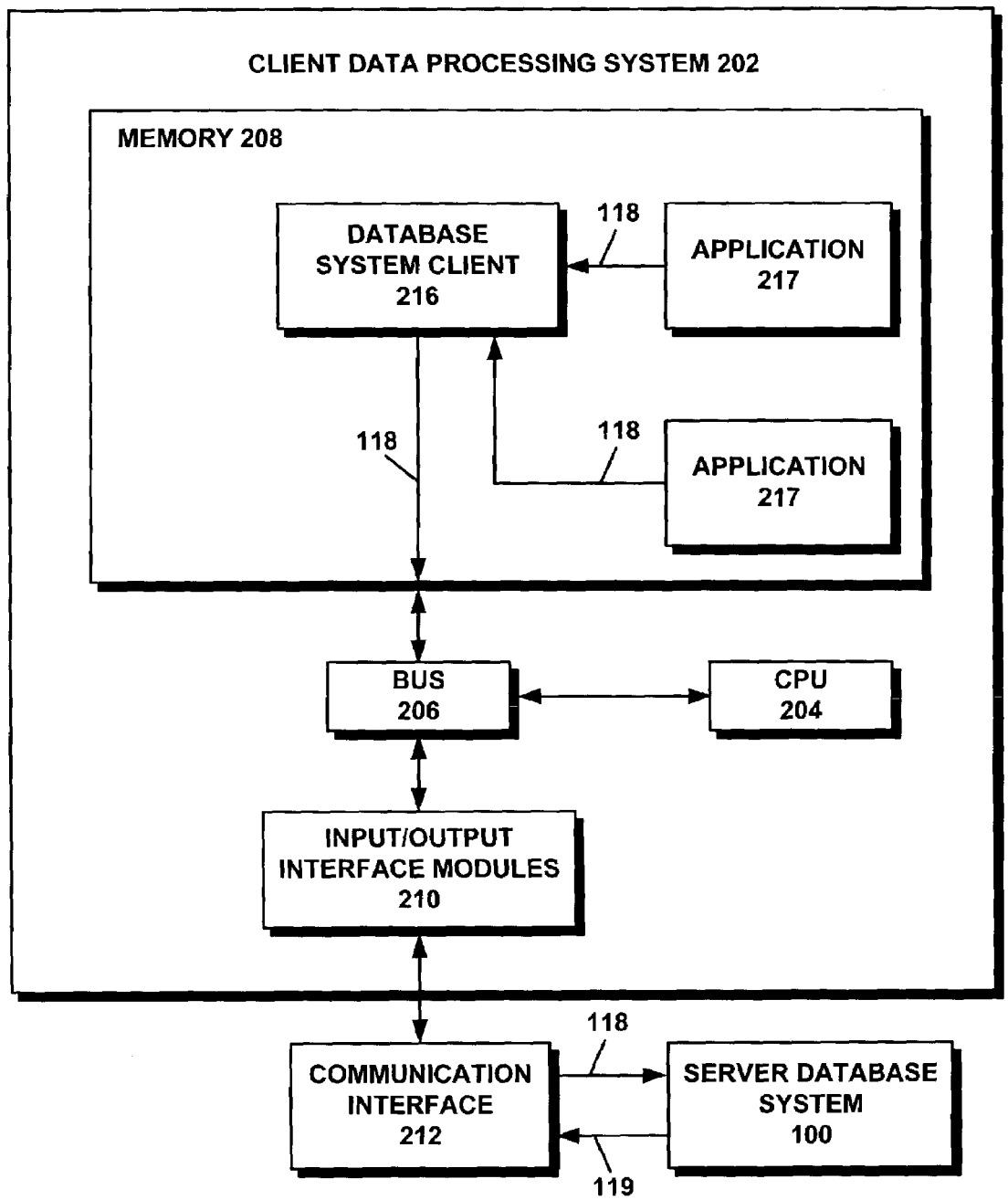
FIG. 2 is a diagram of an exemplary client database system of FIG. 1 in which a large object fetch system of the present invention can be used.

FIG. 2 shows the client database system 200 in greater detail. Components 202 through to 212 of FIG. 2 are generally identical to the corresponding components 102 through to 112 of FIG. 1, as is known in the art. A database system client 216 (alternately referenced as client 216) is a computer executable program that is a companion program to the DBMS 116 program, as is known in the art. The client 216 coordinates the queries 118 and responses 119 of the applications 217 to and from the server database system 100. It is possible that hardware components of the server database system 100 (components 102–112) may be the same physical hardware components of the client database system 200 (corresponding components 202–212), which for simplicity of discussion are depicted here as separate systems.

Accordingly, FIGS. 1 and 2 show an example client-server system made up of the server database system 100 and the client database system 200, where the client applications 217 with the client 216 can reside on the client computer (not shown) and the server application (DBMS 116) can reside on the server computer (not shown). The client database system 200 and the server database system 100 are connected by the communication interface 212, such as but not limited to a local area network (LAN).

In operation of the client-server system, the client 216 sends the request for data 122 (for example in the form of the database query 118) to the DBMS 116. The DBMS 116 processes each of the queries 118 to retrieve data 122 from the tables 120, and returns an answer set in the form of a response 119. The retrieved data 122 can include LOB data (i.e., data having a LOB data type).

Figure 3A:
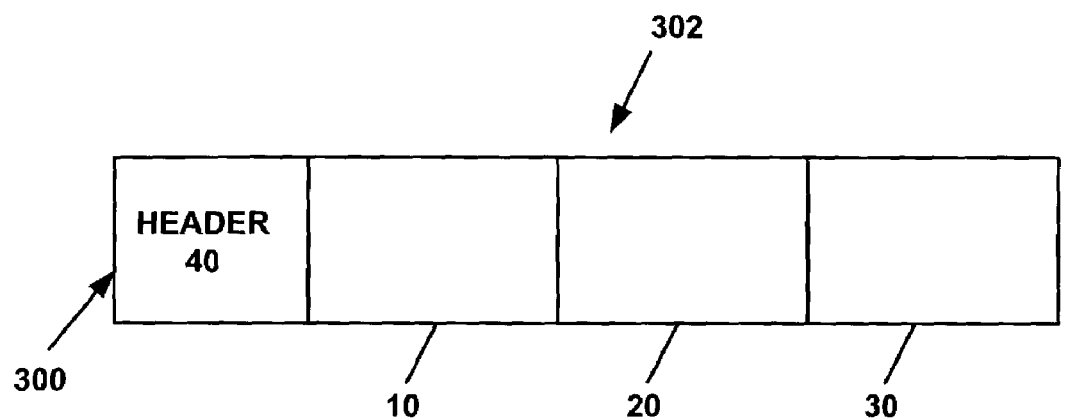
FIG. 3A is a diagram of a data structure of the database of FIG. 1.
Figure 3B:
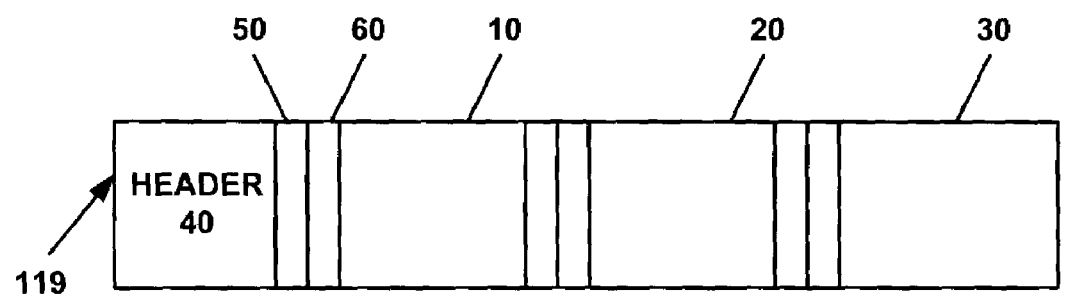
FIG. 3B is a diagram of a response structure of the system of FIG. 1.

FIG. 3, which is comprised of FIGS. 3A and 3B, illustrates an exemplary data and response structure. In response to the query 118 from the application 217, the client database system 200 contacts the server database system 100. The response 119 to the query 118 may contain LOB data 122. Returning the response 119 to the client database system 200 can involve returning the row 300 of data 122 having both standard and non-standard data types.

An exemplary row 300 may have columns 10, 20, and 30, with columns 10 and 30 containing data 122 having standard data types (e.g., integers or characters). Column 20 could contain data having a non-standard data type (e.g., LOB data that consumes two megabytes of space in the tables 120). When the row 300 containing these three columns 302 is transmitted from the server database system 100 to the client database system 200, the data 122 can be transmitted sequentially.

Therefore, the client database system 200 first receives the column 10 of data 122 having the standard database data type, receives the column 20 of data 122 having the non-standard data type, and then receives the column 30 of data 122 having the standard database data type. These columns 302 of data 122 can be stored in a temporary storage location of the memory 208 and then moved to the long-term storage of the memory 208 of the application 217.

Referring to FIG. 3B, the response 119 has a data structure including an inline flag 50 and an inline LOB threshold value 60, as further described below. These flag 50 and threshold value 60 are used as fetch parameters in the query 118 and the response 119. The response 119 also has a header 40. It is recognized that the query 118 has a similar format to the response 119, including row 300, columns 302, the inline flag 50, the inline LOB threshold value 60, and the header 40. The similarity in format of the query 118 and response 119 is typified by the database system client 216 being the computer executable program that is the companion program to the DBMS 116 program. Further, it is recognized that the queries 118 and the responses 119 can contain more than one row 300, if desired.

FIG. 4 shows the computer readable memory 108 of FIG. 1. Stored in the memory 108 are operations S310 of the DBMS 116 of FIG. 1. The operations S310 process a series of requests or queries 118 (see FIG. 1) received from the client 216 of FIG. 2. Within the DBMS 116 there is contained a module 117 or unit of executable computer programmed instructions comprising the operations S360 to S370 for directing the CPU 104 to manage the table 120. The CPU 104 manages the table 120 by creating and transmitting the response 119 as a base data object with the header 40 (see FIG. 3B). For example, operation S360 receives the query 118. Operation S362 parses the query 118.

Operation S364 creates the data base object. Operation S366 completes the columns 302 of the base data object 119 including the inline flag 50 and the inline LOB threshold value 60. Operation S368 returns the base data object in a return buffer (not shown) for transmission to the client database system 200 as the response 119. Operation S370 inquires if there is another query 118 present for processing by the DBMS 116.

In the client-server environment as shown in FIGS. 1 and 2, each fetch query 118 is sent from the client database system 200 to the server database system 100. The server database system 100 can respond to the fetch queries 118 using a predefined protocol, such as a distributed relational database architecture (DRDA) single-row fetch protocol or a DRDA limited block fetch protocol.

Those skilled in the art will recognize that the DRDA protocols discussed herein are not intended to limit the present invention. Indeed, those skilled in the art will recognize that other alternative protocols may be used without departing from the scope of the present invention. For example, the single-row fetch protocol returns each response 119 with either zero rows 300 or 1 row of an answer set (such as but not limited to containing columns 10, 20, 30, flags 50, and thresholds 60). For example, the limited block fetch protocol returns zero to N rows of the answer set for each query 118.

Generally, the variable N is the number of rows that can fit into a query block, wherein the query block is the return buffer that contains the formatted rows 300 of the answer set. It is recognized that the client database system 200 and the server database system 100 may negotiate the return buffer size, and that the answer set rows 300 may be returned to the client database system 200 as a data object. It is also recognized that the server database system 100 can choose the fetch protocol, or the client database system 200 sent instructions associated with the query 118 to use a predefined fetch protocol, e.g., DRDA single row fetch protocol.

It will be appreciated that other operations can be included in the operations S310 as is known in the art. Further, it will be appreciated that the instructions of the module 117 may be implemented in any computer programming language and translated into processor-readable instructions or code for execution by the CPU 104 of the server data processing system 102. In an alternative embodiment, it may be appreciated that operations S360 to S370 may reside in another programmed module (not shown) which operates independently of the DBMS 116. These operations correspond to client queries 118, and a non-exhaustive list of these operations would comprise such as but not be limited to connecting to the tables 120, compiling an SQL statement, fetching data 122, inserting data 122, updating data 122, etc.

FIGS. 3B and 5 show the details of one of the operations S310 that corresponds to the fetch query 118. For this example, it is assumed that operation S364 corresponds to a particular fetch query 118 to retrieve data 122 from the table 120, where one or more columns 302 contains LOB data 122. Prior to making the fetch query 118 to the server database system 100, the client 216 presets the inline LOB flag 50 for querying a LOB value, and presets the inline LOB threshold value 60 to a value such as but not limited to 10,000 bytes.

This flag 50 and threshold value 60 alter the fetch processing of the DBMS 116 as further described below. Referring again to FIG. 5, as the server database system 100 is processing operation S364, the operation S364 loops through each of the columns 302 in the answer set for each row 300 of the answer set represented in the response 119. The server database system 100 retrieves the values of data 122 from the database tables 120, and binds them out as quantities in the response 119 and through the communication interface 112 for delivery to the client database system 200.

Operation S402 represents the start of processing for each row 300 of the answer set. In operation S404, the large object fetch system determines whether the column 302 represents a LOB value. If the column 302 does not represent a LOB value, operation S406 could perform a conventional bind out process. If the column 302 does represent a LOB value, the large object fetch system proceeds to operation S408. The large object fetch system determines in operation 408 whether the inline LOB flag 50 is set.

If the inline LOB flag 50 is not set for this LOB column 302, traditional LOB bind out occurs at operation S410. If the inline LOB flag 50 is set for this LOB column 302, the flag 50 is set as a fetch LOB request. Operation S412 determines if the LOB size for this column 302 is less than or equal to the inline LOB threshold 60 specified for this column 302. If the size is less than or equal to the inline LOB threshold 60, a first binding operation S416 is executed which places an inline LOB indicator in the flag 50 of the response 119. This inline LOB indicator verifies the presence of the LOB value as a return quantity in the respective column 302 of the base data object. The large object fetch system then places the LOB data value inline in the response 119 being sent to the client database system 200.

Alternatively, if operation S412 indicates the LOB size is greater than the inline LOB threshold 60, then a second binding operation S414 is executed which places an inline LOB locator in the flag 50, followed by the LOB locator as the return quantity for this LOB column. All processing continues with operation S418 that loops over all columns 302 in the row 300.

As is known in the art, the LOB locator provides only a handle flow returned from the server database system 100 to the application 217 of the client database system 200. The actual LOB value remains on the server database system 100 until the application 217 is ready to fetch it in a subsequent query 118. Two distinct indicators, the inline LOB indicator and the inline LOB locator indicator, return states of the flag 50.

The flag 50 is used by the client 216 to determine, on a column by column basis, transmission of the LOB value or the LOB locator in the corresponding column 302 of the response 119. This provision allows the client database system 200 to help interpret the data 122 being sent by the server database system 100. With these two distinct indicator return states of the flag 50, the delivery of the LOB data 122 by either the inline LOB value or the LOB locator can be transparent to the client application 217 after the client application 217 has enabled LOB inlining.

FIG. 6 details the companion client 216 operation of the corresponding operation S364 as was detailed in FIG. 5. The client database system 200 processes the fetched values returned from the server database system 100 in the response 119 (see FIG. 3). As these values are processed, the client 216 loops through each of the columns 302 in the answer set of the response 119. The client 216 retrieves the values of the data 122 from the communication interface 212 and binds them out to buffers provided by the user application 217 driving the query 118.

Operation S502 represents the start of processing for each row 302 of the response 119. The client 216 determines in operation S504 whether the column 302 represents a LOB value. If the column 302 does not represent a LOB value in operation S504, operation S506 performs traditional bind out processing, as it is known in the art.

For the LOB value, operation S508 determines whether the inline LOB indicator is present in the flag 50. If true, the data 122 immediately following the inline LOB indicator is perceived by the client 216 as the inline LOB value, and this data 122 is bound out to the client application 217 in operation S510.

If the inline LOB indicator is not present in the flag 50, operation S512 checks for the inline LOB locator indicator in the flag 50. If the inline LOB locator indicator is present, the data 122 following is perceived by the client 216 as the LOB locator and that data 122 is bound out to the client application 217 in operation S514. If neither of these distinct indicators were present in the respective column 302 of the response 119, then operation S516 would perform traditional LOB bind out as it is known in the art. The operation continues at block S518 that loops over all columns 302 in the row 300. The LOB indicator and the LOB locator are considered distinct return states of the flag 50 (i.e. fetch parameter).

Accordingly, in view of the above, the use of distinct indicators in the flags 50 of the response 119 provides a mechanism by which the server database system 100 can make a dynamic decision of sending either a LOB locator or the inline LOB value in the response 119. This decision depends upon the specific value of the LOB in comparison to the threshold value 60.

Consequently, the LOB values below the threshold 60 are sent as values in the columns 302 of the response 119, while the LOB values above the threshold 60 are sent as locators. The flag 50 uses the distinct indicator values to help inform the client 216 of the form of retrieval present in the response 119 as a result of the query 118. It is recognized that the flags 50 and/or the thresholds 60 may be stored/read in the header 40 (see FIG. 3A, 3B), in the columns 302 as inline values, or a combination thereof. Further, it is recognized that default threshold values 60 can be used for each LOB by the server database system 100 and/or a single threshold value 60 can be used for more than one column 302 for comparison against multiple LOB values requested in the query 118.

In an alternative embodiment, there is provided a computer program product having a computer-readable medium tangibly embodying computer executable instructions for directing a data processing system to implement any method as previously described above. It will be appreciated that the computer program product may be a floppy disk, hard disk or other medium for long term storage of the computer executable instructions.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the scope and spirit of the present invention.

What is claimed is:

1. A method for directing a database management system to execute a fetch query, comprising:
   receiving the fetch query that contains at least one large object fetch request and a predefined threshold parameter associated with the large object fetch request;
   accessing a selected large object value that corresponds to the large object fetch request of the fetch query;
   comparing the selected large object value with the predefined threshold value;
   returning a fetch response that corresponds to the large object fetch request according to a return operation from a pair of return operations; and
   wherein the pair of return operations comprises:
      a first return operation that returns the selected large object value in the large object fetch response, if the large object value is less than the predefined threshold value; and
      a second return operation that returns a large object locator that is associated with the large object value in the large object fetch response, if the large object value is greater than the predefined threshold value;
   wherein the fetch response comprises a fetch parameter associated with the large object fetch response;
   placing an indicator in the fetch parameter; and
   wherein the indicator comprises one of two distinct return states, a first state that is placed by the first return operation and a second state that is placed by the second return operation.

2. The method according to claim 1, wherein the first state comprises a large object indicator that indicates the presence of the large object value in the fetch response.

3. The method according to claim 2, wherein the second state comprises a large object locator that indicates the location of a large object value remaining for a subsequent fetch operation.

4. The method according to claim 1, further comprising a plurality of fetch parameters, wherein each of the fetch parameters comprises an inline parameter associated with a respective large object fetch response.

5. The method according to claim 4, further comprising representing the large object fetch request by a column in the fetch query.

6. The method according to claim 1, further comprising using a fetch parameter in the fetch query to confirm if a fetch request is a large object fetch request, prior to accessing the selected large object value.

7. The method according to claim 5, wherein the predefined threshold parameter is an inline parameter associated with the large object fetch request.

8. The method according to claim 1, wherein the predefined threshold parameter is a default value associated with the database management system.

9. A computer program product having instruction codes for directing a database management system to execute a fetch query, comprising:
   a first set of instruction codes for receiving the fetch query that contains at least one large object fetch request and a predefined threshold parameter associated with the large object fetch request;
   a second set of instruction codes for accessing a selected large object value that corresponds to the large object fetch request of the fetch query;
   a third set of instruction codes for corn paring the selected large object value with the predefined threshold value;
   a fourth set of instruction codes for returning a fetch response that corresponds to the large object fetch request according to a return operation from a pair of return operations; and
   wherein the pair of return operations comprises:
      a first return operation that returns the selected large object value in the large object fetch response, if the large object value is less than the predefined threshold value; and
      a second return operation that returns a large object locator that is associated with the large object value in the large object fetch response, if the large object value is greater than the predefined threshold value;
   wherein the fetch response comprises a fetch parameter associated with the large object fetch response;
   a fifth set of instruction codes for placing an indicator in the fetch parameter; and
   wherein the indicator comprises one of two distinct return states, a first state that is placed by the first return operation and a second state that is placed by the second return operation.

10. The computer program product according to claim 9, wherein the first state comprises a large object indicator that indicates the presence of the large object value in the fetch response.

11. The computer program product according to claim 10, wherein the second state comprises a large object locator that indicates the location of a large object value remaining for a subsequent fetch operation.

12. The computer program product according to claim 9, further comprising a plurality of fetch parameters, wherein each of the fetch parameters comprises an inline parameter associated with a respective large object fetch response.

13. The computer program product according to claim 12, further comprising a sixth set of instruction codes for representing the large object fetch request by a column in the fetch query.

14. The computer program product according to claim 9, wherein the fetch query comprises a fetch parameter that confirms if a fetch request is a large object fetch request prior to accessing the selected large object value.

15. The computer program product according to claim 13, wherein the predefined threshold parameter is an inline parameter associated with the large object fetch request.

16. The computer program product according to claim 1, wherein the predefined threshold parameter is a default value associated with the database management system.

17. A system for directing a database management system to execute a fetch query, comprising:
   means for receiving the fetch query that contains at least one large object fetch request and a predefined threshold parameter associated with the large object fetch request;
   means for accessing a selected large object value that corresponds to the large object fetch request of the fetch query;
   means for comparing the selected large object value with the predefined threshold value;
   means for returning a fetch response that corresponds to the large object fetch request according to a return operation from a pair of return operations; and
   wherein the pair of return operations comprises:
      a first return operation that returns the selected large object value in the large object fetch response, if the large object value is less than the predefined threshold value; and
      a second return operation that returns a large object locator that is associated with the large object value in the large object fetch response, if the large object value is greater than the predefined threshold value;
   wherein the fetch response comprises a fetch parameter associated with the large object fetch response;
   means for placing an indicator in the fetch parameter; and
   wherein the indicator comprises one of two distinct return states, a first state that is placed by the first return operation and a second state that is placed by the second return operation.

18. The system according to claim 17, wherein the first state comprises a large object indicator that indicates the presence of the large object value in the fetch response.

19. The system according to claim 18, wherein the second state comprises a large object locator that indicates the location of a large object value remaining for a subsequent fetch operation.

20. The system according to claim 17, further comprising a plurality of fetch parameters, wherein each of the fetch parameters comprises an inline parameter associated with a respective large object fetch response.

21. The system according to claim 20, further comprising means for representing the large object fetch request by a column in the fetch query.

22. The system according to claim 17, wherein the fetch query comprises a fetch parameter that confirms if a fetch request is a large object fetch request prior to accessing the selected large object value.

23. The system according to claim 21, wherein the predefined threshold parameter is an inline parameter associated with the large object fetch request.

24. The system according to claim 17, wherein the predefined threshold parameter is a default value associated with the database management system.

* * * * *